UNITED STATES PATENT OFFICE.

BERNHARD DEUTECOM, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

PROCESS OF MAKING ALKALI HYDROSULFITES.

935,001. Specification of Letters Patent. Patented Sept. 28, 1909.

No Drawing. Application filed November 3, 1908. Serial No. 460,971.

*To all whom it may concern:*

Be it known that I, BERNHARD DEUTECOM, chemist, citizen of the German Empire, residing at Leverkusen, near Cologne, Kingdom of Prussia, Germany, have invented new and useful Improvements in Processes of Making Alkali Hydrosulfites, of which the following is a specification.

I have found that while sodium hydrosulfite is scarcely soluble in ammonia, hydrosulfite compounds of zinc, especially zinc hydrosulfite, its double salts; *e. g.* zinc sodium hydrosulfite and its complex compounds; *e. g.* zinc hydrosulfite ammonium chlorid, are easily soluble in it. From such a concentrated ammoniacal solution, the sodium or potassium hydrosulfite is precipitated if such sodium or potassium compounds as sodium chlorid, potassium chlorid, acetate of sodium, acetate of potassium, etc. are added. Generally speaking, alkali salts of acids which form zinc salts soluble in ammonia water, preferably containing an excess of ammonia, may be employed for this precipitation. They are used in a quantity equivalent to the hydrosulfurous acid contained in the solution.

On using zinc sodium hydrosulfite, of course only such a quantity of the alkali compound needs to be added as is equivalent to the zinc.

If the alkali compound is added in solution it is advisable in order to accelerate the precipitation of the alkali hydrosulfite to "seed" the solution, that is to introduce a very small quantity of a crystal of a solid sodium or potassium compound *e. g.* NaOH, ClK, ClNa. The hydrosulfite thus obtained is practically free from zinc or other salts and by-products.

The reaction, which must be carried out at temperatures below 50° C., as at higher temperatures hydrosulfites are decomposed, probably proceeds according to the following formulæ:

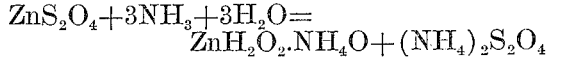

The process above described has the advantage that the alkali hydrosulfite is at once obtained in a solid state without the costly process of having to evaporate its solution, while the zinc remains dissolved.

I claim:—

The process of producing alkali hydrosulfites from hydrosulfite compounds of zinc, which process consists in dissolving the latter salts in ammonia, treating this solution with an alkali salt of an acid which forms salts of zinc soluble in ammonia water and isolating the alkali hydrosulfites which are thus caused to crystallize out, substantially as herein described.

In testimony whereof I have hereunto set my hand in the presence of two subscribing witnesses.

BERNHARD DEUTECOM. [L. S.]

Witnesses:
OTTO KÖNIG,
WALTER SLUISKAMP.